(12) United States Patent
Comoglio

(10) Patent No.: US 6,852,183 B2
(45) Date of Patent: Feb. 8, 2005

(54) METHOD OF SEALING A HOLLOW STRUCTURE, FOR EXAMPLE A FUEL TANK FOR AN AIRCRAFT

(75) Inventor: Bruno Comoglio, Chasselay (FR)

(73) Assignee: Sunaero, Genay (FR)

( * ) Notice: Subject to any disclaimer, the term of this patent is extended or adjusted under 35 U.S.C. 154(b) by 135 days.

(21) Appl. No.: 10/386,517

(22) Filed: Mar. 13, 2003

(65) Prior Publication Data

US 2003/0230673 A1 Dec. 18, 2003

Related U.S. Application Data

(60) Provisional application No. 60/389,909, filed on Jun. 20, 2002.

(51) Int. Cl.$^7$ .............................................. B32B 31/26
(52) U.S. Cl. ...................... 156/64; 156/94; 156/275.1; 156/275.7
(58) Field of Search ........................ 156/64, 94, 272.2, 156/275.7, 275.1, 359; 29/402.18, 402.02; 264/36.15; 427/140; 228/119; 220/4.14, 4.15

(56) References Cited

U.S. PATENT DOCUMENTS

| | | | |
|---|---|---|---|
| 3,645,816 A | | 2/1972 | Billias et al. |
| 4,874,445 A | * | 10/1989 | Lavoie .................. 156/64 |
| 6,076,769 A | | 6/2000 | Gallegos |
| 6,245,194 B1 | | 6/2001 | Olster et al. |

* cited by examiner

*Primary Examiner*—Chris Fiorilla
*Assistant Examiner*—George Koch
(74) *Attorney, Agent, or Firm*—Oliff & Berridge, PLC

(57) ABSTRACT

Sealing method, used inside a hollow structure (1) with a bonding material (11) of the mastic type, comprising the following steps:

(a) a moveable source (6) of infrared radiation (IR) is used;

(b) at least one said bonding material M, chosen according to its thermosetting characteristics is used;

(c) the structural parts (3) and (4) of their structure (1) are connected with a bead (8) of the bonding material along the leak line (5) portion;

(d) the IR source (6) is placed inside the hollow structure (1) in a position to illuminate the bead (8) of bonding material;

(e) the IR radiation (9) is emitted in the illumination position of the said IR source; and (f) a working temperature ($T_1$) at the said bead is detected, characterized in that, on the one hand, the working temperature ($T_1$) approximately at the center of the IR illumination beam (9) is detected (according to f) and, on the other hand, an effective temperature ($T_2$) in a control region at the said bead (8) is detected in order to control the emission time (D) of the IR radiation as a function of the effective temperature ($T_2$) detected, in relation to the thermosetting characteristics of the bonding material (M).

3 Claims, 4 Drawing Sheets

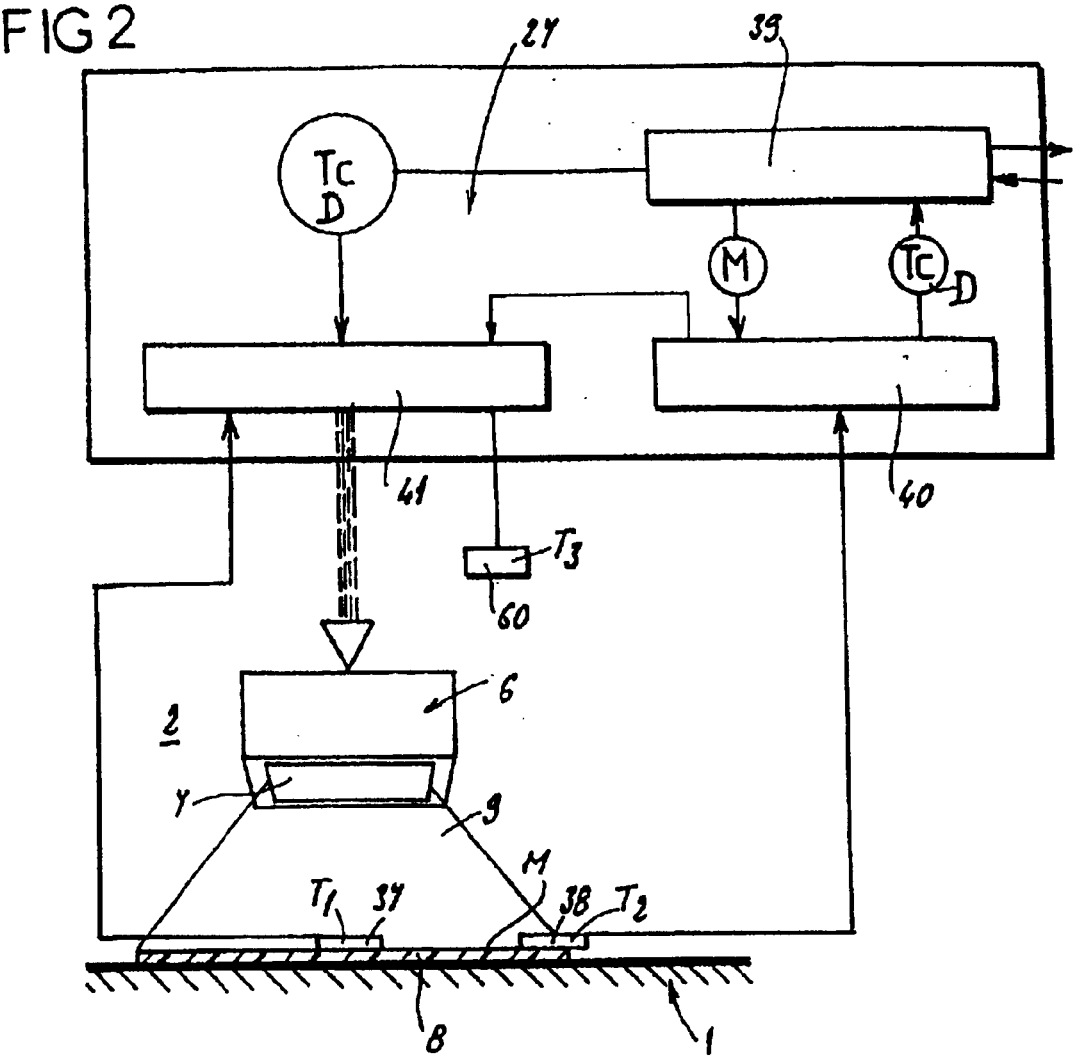
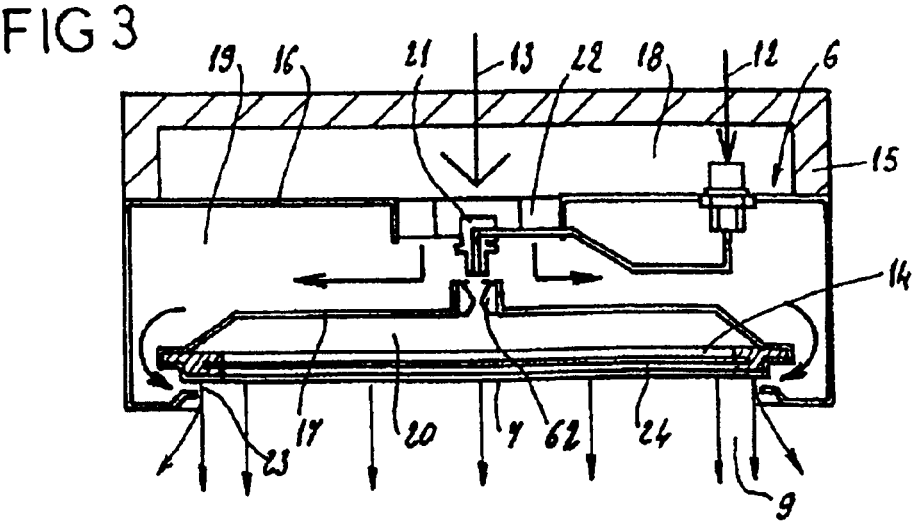

METHOD OF SEALING A HOLLOW STRUCTURE, FOR EXAMPLE A FUEL TANK FOR AN AIRCRAFT

This nonprovisional application claims the benefit of U.S. Provisional Application No. 60/389,909, filed Jun. 20, 2002.

BACKGROUND OF THE INVENTION

The present invention relates in general to the sealing of a confined cavity, defined by the inside of a hollow structure, which itself consists of a mechanical assembly of several parts, subassemblies or components, the said structure moreover having a defined function or role, as it belongs to an apparatus or device or machine.

As an example, but not in a limiting manner, the present invention will be introduced, defined and explained with reference to aircraft, including transport planes, and to any fuel tank incorporated into the structure of the said aircraft in the following manner:

to save weight or space, all or some of the tanks required for storing fuel are obtained using the confined volume(s) of one or more hollow structures, for example those belonging to the wings, in order to contain the stored fuel directly;

for this purpose, the line or the various lines joining the parts of the structure defining the confined volume that forms a tank, which are liable to form respectively one or more leak lines to the outside of the hollow structure used for storing the fuel, are sealed with any bonding material or seal having the required characteristics, both mechanical and sealing characteristics, in order to directly obtain the desired tank in the hollow structure used for this purpose.

The term "sealing" is understood to mean both the original sealing of the hollow structure, that is to say at the time of its construction, including assembly, and subsequent sealing, for example for carrying out maintenance, including repair, on this same hollow structure.

The present invention relates more particularly, but not exclusively, to the sealing of a hollow structure as defined above, for example an aircraft tank, for the purpose of repairing it.

When repairing an aircraft tank, consisting of a hollow structure, for example in its wing, this very often entails having to seal the entire leak line to the outside of the hollow structure, identified beforehand and located as to its position and its extension, for example with the aid of the aircraft construction drawings.

BRIEF SUMMARY OF INVENTION

So as to seal the leak line thus detected, it is known to seal it in the following manner, operating inside and within the very hollow structure that forms the tank:

a) a moveable source of infrared radiation (IR), in a wavelength spectrum of between 2 and 10 μm, with for example a plane emission surface suitable for irradiating or illuminating the leak line portion, is used;

b) moreover, at least one bonding material, of the adhesive and thermosetting mastic type, is used and this bonding material is chosen especially according to its thermosetting characteristics, namely thermosetting time in relation to respectively different thermosetting temperatures, in order to obtain, after thermosetting or curing, a predetermined hardness and/or the absence of tack;

c) the structural parts adjacent to the leak line are connected with a bead of the bonding material along the portion in question of the said leak line;

d) the IR source is placed, inside the hollow structure, in a position to illuminate the bead of bonding material that will ensure sealing; for this purpose the IR source has, of course, a size, by construction, compatible with its being introduced into and placed in the hollow structure;

e) by turning the IR source on, the IR radiation is emitted in the illumination position of the said source; and f) for checking purposes, a temperature, called the first temperature or working temperature, is detected at the bead whose bonding material thermally cures, with respect to a temperature called the set temperature, and the power emitted by the IR source is regulated according to the working temperature and the set temperature.

In general, the duration of emission of the IR radiation during step (e) is controlled by the operator himself, according, on the one hand, to the desired characteristics of the thermally cured bonding material installed in the leak line and, on the other hand, in correspondence with the physicochemical characteristics of the mastic bonding material.

The term "mastic" is understood to mean any product, substance or material capable of having two states:

a pasty and adhesive state, when it is prepared or ready for use, then put into place, for example in the aforementioned leak line; and a hard and mechanically strong state, once it has cured, since it contains for example a thermosetting resin, the hardening involving the curing and/or crosslinking of the said product, substance or material.

By way of example, the desired characteristic(s) of the thermally cured bonding material is (are) the following:

a hardness compatible with the mechanical strength also required of the hollow structure, expressed for example by a minimum Shore hardness value; and/or the absence of tack.

In practice, sealing a hollow structure of the aircraft tank type using the technique described in general terms above remains a difficult and delicate operation, since the bonding material must be thermally cured right to the core, and not only on the surface, in order to obtain the mechanical and sealing properties expected of it, in the form of a bonding or blocking bead inside the said hollow structure.

However, there are many reasons preventing uniform depthwise thermal curing, particularly over the entire length of the bonding bead.

The temperature to which the bonding material is raised must remain limited in order to preserve, for example during repair, the hollow structure from any differential expansion deformation; in this case much longer times have to be considered during the IR radiation emission, or "drying", step in order to result in the bonding material being thermally cured to the core.

Various obstacles placed in the confined volume of the hollow structure may impede the direct IR illumination of the bead to be thermally cured and create as it were shadow regions prejudicial to the heat reaching and penetrating the bonding material.

The bead undergoing thermal curing may undergo differentiated heat exchange according to the regions in question, which heat exchange depends in particular on the local thicknesses of the material to be thermally cured.

Nevertheless, and in particular in the field of the aeronautics industry, bonding beads thermally cured or "dried"

correctly are required in order to maintain sealing with respect to the outside and the mechanical properties of the hollow structure.

The subject of the present invention is therefore a sealing method as defined above, which guarantees homogeneous and uniform thermal curing, that is to say curing practically throughout the thickness and the length of the bonding bead, particularly in an automated manner, and practically independently of the environment within the hollow structure to be sealed.

According to the present invention, on the one hand, the working temperature approximately at the centre of the IR illumination beam is detected during step (f) defined above and, on the other hand, a temperature called the effective temperature, in a control region, away from the centre of the said illumination beam and at the bead of bonding material is detected in order to control the emission time of the IR radiation according to the effective temperature detected, in relation to the thermosetting characteristics of the bonding material.

BRIEF DESCRIPTION OF DRAWINGS

The present invention will now be described with reference to the appended drawing, in which:

FIG. 2 shows schematically the implementation of the sealing method according to the invention;

FIG. 3 shows schematically the construction of the moveable IR source used to carry out the sealing method according to the invention;

DETAILED DESCRIPTION OF PREFERRED EMBODIMENTS

Before using the sealing method according to the invention, a fuel leak has been detected in a line 5, between two parts 3 and 4 forming part of the same hollow structure 1, for example forming part of a wing of an aircraft, the confined volume of which forms directly a tank for the said fuel.

Figure 1:
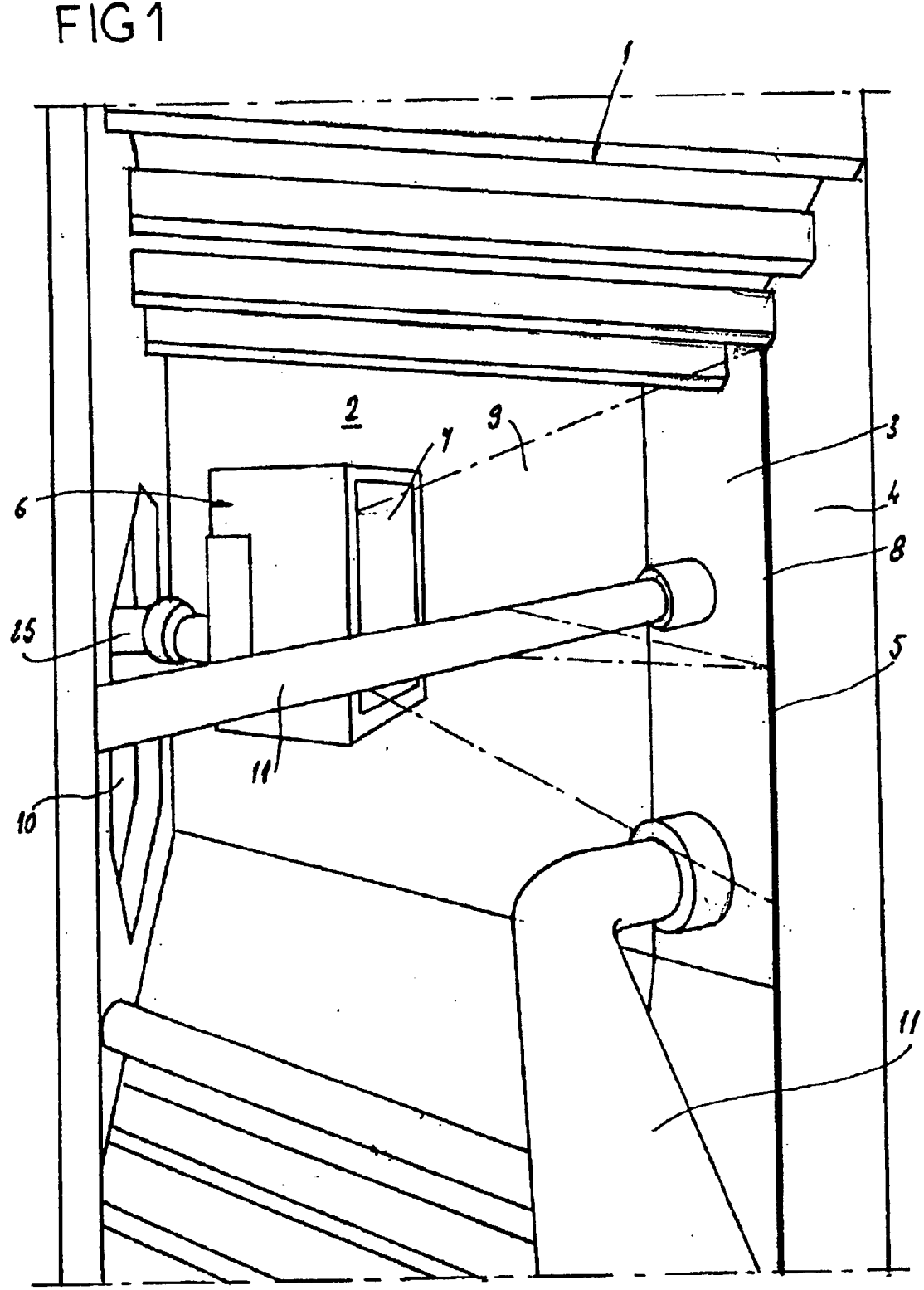
FIG. 1 shows schematically, and seen in perspective, the inside of a hollow structure (the wing of an aircraft), defining a confined volume forming a tank undergoing repair, that is to say being sealed, by means of a bead of a mastic-type bonding material, in the course of "drying" or thermal curing.

As FIG. 1 shows, the volume 2 is accessible via an aperture 10 provided in the hollow structure 1, but it is encumbered by various elements such as the pipe 11 passing through it.

Before using the method according to the invention, the effective portion of the leak line 5 has been detected, located and evaluated by any appropriate means, for example by means of a helium leak detector (like that sold by the French company Helitest under the name HELITEST WING), referring in particular to the construction drawing for the wing or for the aircraft.

Next, the old sealant, for example mastic, is removed along the junction between the parts 3 and 4 and this junction is then cleaned and dried, over the entire length corresponding to the identified portion of the line 5 leaking to the outside of the hollow structure 1.

The method according to the invention is then carried out, on condition of having, on the one hand, a moveable source 6 of infrared' radiation (IR) and, on the other hand, at least one suitable bonding material.

As regards the source 6 of infrared radiation, a corresponding device or instrument, allowing emission in a wavelength spectrum of between 2 and 10 $\mu$m, with a plane emission surface 7, is shown in FIG. 3 and described below as an example.

The instrument in FIG. 3 is designed to emit the aforementioned IR radiation by the catalytic combustion of a combustible mixture of a fuel gas 12 (for example butane or propane) and oxidizer air 13, inside a flat catalytic screen 14, in the form of a plate, through which screen the said combustible mixture flows from its upstream face to its downstream face.

The downstream face of the catalytic screen 14 constitutes the emission surface 7 mentioned previously.

For the purpose of this operation, the source 6 or instrument comprises, in a manner known per se:

a bracket 15 for supporting the casing 16 described below;

a casing 16 of parallelepipedal shape, defining within it, by means of a partition 17, a chamber 19 into which the oxidizer air is taken and in which the latter flows, and a chamber 20 for distributing the combustible mixture over the catalytic screen 14;

an injector 21 for delivering, under pressure, a jet of the fuel gas 12;

a fan-type forced-circulation means 22 for introducing the oxidizer air 13 into the chamber 19 and making it circulate therein;

a venturi-type means 62 for mixing the oxidizer air in the jet of fuel gas in order to obtain the combustible mixture distributed in the chamber 20;

orifices 23 for discharging the oxidizer air being provided in the casing 16, on the output side of the chamber 19, tracing the catalytic screen 14; and an electrical resistance element 24, embedded in the screen 14, for heating the latter and making it operate by the flow of an electric current and the Joule effect.

As already indicated, the instrument described above therefore constitutes a moveable infrared emission source that can be fixed, for example in a removable manner, to the end of a support or arm 25, shown in FIG. 1, by means of the bracket 15. Such an infrared source is known per se and is manufactured and sold by the Applicant under the brand name 28 Vcc RXPAFEX, for example.

Of course, the dimensions and the size of the IR source is 6 thus chosen are suitable, on the one hand, for penetrating through the orifice 10 shown in FIG. 1 and, on the other hand, for irradiating, in the use position and via its emission surface 7, the treated portion of the leak line 5, and more specifically the bead 8 of the bonding material subsequently applied or installed in the said leak line.

The bonding material M, of the mastic type, is adhesive and thermosetting as indicated above. It is firstly chosen according to the conditions under which the aircraft is used and operated. It is then defined according to its thermosetting characteristics, namely the thermosetting time in relation to respectively different thermosetting temperatures in order to obtain, after thermosetting, a predetermined hardness and/or absence of tack.

Such bonding materials are commercially available, for example under the brand names PR1776 A or PR1776 B from the French company Le Joint Francais or from the United States company PRC-DeSoto International for example, and the thermosetting characteristics of the bonding material used may be expressed or described empirically as follows:

the "drying" or setting or curing time is to be distinguished from the application time, the latter being the time during which the consistency of the bonding material allows it to be applied by any suitable means, for example a spatula;

the setting time depends on the temperature and the degree of moisture in the confined volume in which the bonding means is treated; and the setting time is determined experimentally, or by approximation, as a function of the temperature, and the values obtained may be stored in the form of a database.

Such materials are, for example, based on any liquid polymer of the polysulphide type.

Moreover, for the purposes of checking the method described below, and more specifically the operating parameters for the IR radiation emission step (e), in the illumination position of the IR source, there are two temperature sensors 26 (each shown in FIG. 4 in their use position) on the one hand and a control module 27 on the other.

Figure 4:
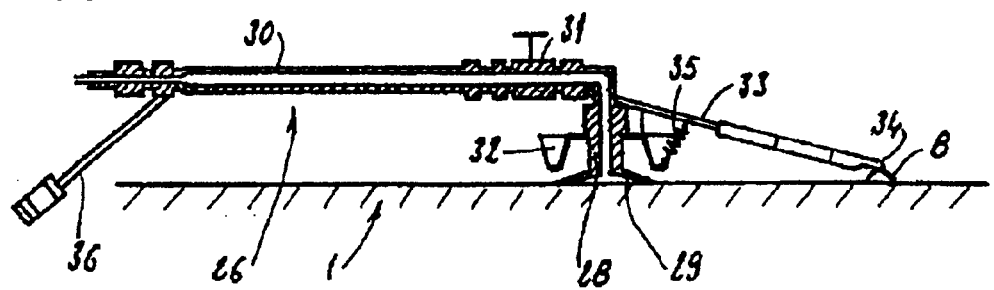
FIG. 4 shows schematically, and in longitudinal section, a temperature sensor suitable for implementing the method according to the invention, shown in its position of use inside the hollow structure treated according to the invention.

According to FIG. 4, each temperature sensor 26 comprises, in a manner known per se:

a base 28 provided with a sucker 29;

a tube 30 placed so as to be perpendicular to the base 29, having a passage for communication with, on one side, a hose for connection to a vacuum source and, on the other side, to the sucker 29, controlled by a tap 31;

a bracket 32 on which a lance 33 is articulated, the said lance having at its free end a detection thermocouple 34 and being rotationally returned towards the sucker 29 by a spring 35, the fixed end of which is mounted on the bracket 32: and a cable 36 for electrical connection to the thermocouple 34, the cable being fixed to the tube 30.

As indicated in FIG. 2, and for the requirements of the description below, it is convenient to distinguish a first sensor 37 detecting a first temperature, called the working temperature $T_1$, from a second sensor 38 detecting a second temperature called the effective temperature $T_2$; however, each of these sensors has the construction described with reference to FIG. 4.

The control device 27 makes it possible in general to control, on the one hand, the thermal power emitted by the IR source 6, by acting on the flow rate of the fuel gas 12 and, on the other hand, the operating time of the IR source 6.

This control device 27, operated in an analogue or computing manner, has a user interface 39, a computing device or computer 40 and a regulator 41 connected to the IR source 6.

As shown in FIGS. 1 and 2, the components or devices described above are used as follows:

the structural parts 3 and 4 are joined together with a bead of the bonding material M along the treated portion of the leak line 5;

the IR source 6 is then introduced into the hollow structure 1 and placed therein in a position for illuminating the bead 8 of the bonding material;

the IR source 6 is connected, in terms of supply, by any appropriate means of the hose or cable type, to a source of oxidizer air 13, a source of fuel gas 12 and an electrical supply for operating the forced convection means 22 and for heating the resistance element 24:

the temperature sensors 37 and 38 are placed, respectively:

at the centre of the infrared illumination beam 9, the corresponding thermocouple 34 being placed so as to be in contact at the bead 8 to be thermally cured, and in a control region, away from the centre of the beam 9, with the corresponding thermocouple 34 in contact with the bead 8, this control region being chosen by the user or operator, as being critical in order for the bead 8 to be cured to the core; this is, for example, an outermost or peripheral region of the bead 8;

the sensors 37 and 38 are in turn electrically connected by their cables 36 to the regulator 41 and to the computing device 40, respectively; and when all the appropriate fluid and electrical connections have been made, the IR source 9 is operated, in its use position, by means of the user interface 39.

From then on, two control loops come into play in order to control the operation of thermally curing the bead 8.

A first loop links the first sensor 37, the regulator 41 and the fuel gas flow rate control 12, via the valve, according to the following scheme:

the working temperature $T_1$ at the bead 8, and at the centre of the IR illumination beam, is detected by the sensor 37, the bonding material M of the bead 8 then undergoing thermal curing;

the user or operator inputs, via the interface 39, the data relating to the bonding material M into the computer 40, which in turn sets a set temperature Tc for the thermosetting operation; and consequently, the power emitted by the IR source 6 is regulated according to the working temperature $T_1$, compared with the set temperature Tc.

The second control loop links the second temperature sensor 38, the computer 40 and the regulator 41, according to the following scheme:

a temperature called the effective temperature $T_2$ in the said control region and at the bead 8 is detected by the sensor 38;

the IR radiation emission time or duration is permanently determined, in the computer 40, for example using any suitable algorithm, described for example below with reference to FIG. 6, as a function of the said detected temperature $T_2$ and in relation to the thermosetting characteristics of the bonding material M, and as a function of the data input by the user via the interface 39, these characteristics being stored in the memory of the computer 40; and at the end of the time D, the regulator 41, controlled by the computer 40, interrupts the operation of the IR source 6.

The algorithm for operating the computer 40 adopts the following operating logic:

for the same set temperature Tc, the emission time D of the IR radiation 9 is increased when the effective temperature $T_2$ decreases, in relation to the abovementioned thermosetting characteristics of the bonding material.

Figure 6:
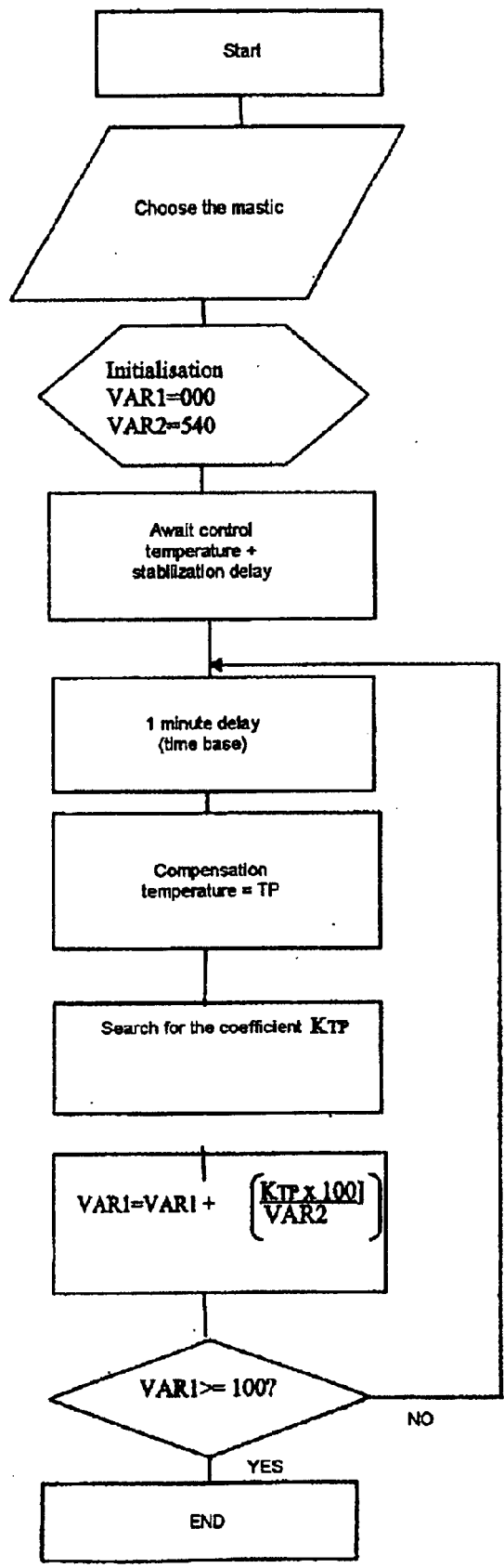
FIG. 6 shows, by way of example, a flowchart indicating the operation of the computer with the numerical reference 40.

This algorithm corresponds, for example, to the flowchart in FIG. 6, in which the identified steps are the following:

101: choice of the mastic by the user from the available types of mastic;

102: initialization of the variables:

VAR1=percentage cure achieved

VAR2=necessary cure time at 50° C. (according to the database specific to the mastic);

103: the computer waits for the return of information from the regulator 41 indicating to it that the control temperature Tc has been reached, and then for a certain time in order for the effective temperature $T_2$ to stabilize at the value Tc;

104: computing time base;

105: reading of the temperature $T_2$ of the compensation probe 38;

106: search for the correcting coefficient KTP in the database for the mastic selected;

107: determination of the corrected elapsed time, with respect to the percentage of the complete cure time at 50° C. (VAR2);

108: check at the end of the cure time if 100% cure has been achieved.

The formula of step 107 is determined as follows:

The complete cure time for the mastic chosen under the best conditions (at 50° C.) is 360 min (VAR2=360), hence 360→100% cure.

For each minute elapsed, if the temperature $T_2$ is 50° C., the "minute" is counted as 1 (K50=1).

If the temperature is below this, the "minute" is corrected; for example at 49° C., it is counted only as one half (K49=0.5).

In each calculation loop, the variable VAR1 is therefore incremented by the corrected "minute" (with respect to the percentage of the complete cure time).

The end of the cure time is therefore effective when VAR1=100.

The duration of the time base will be determined with respect to the rate of variation of the temperature.

Figure 5:
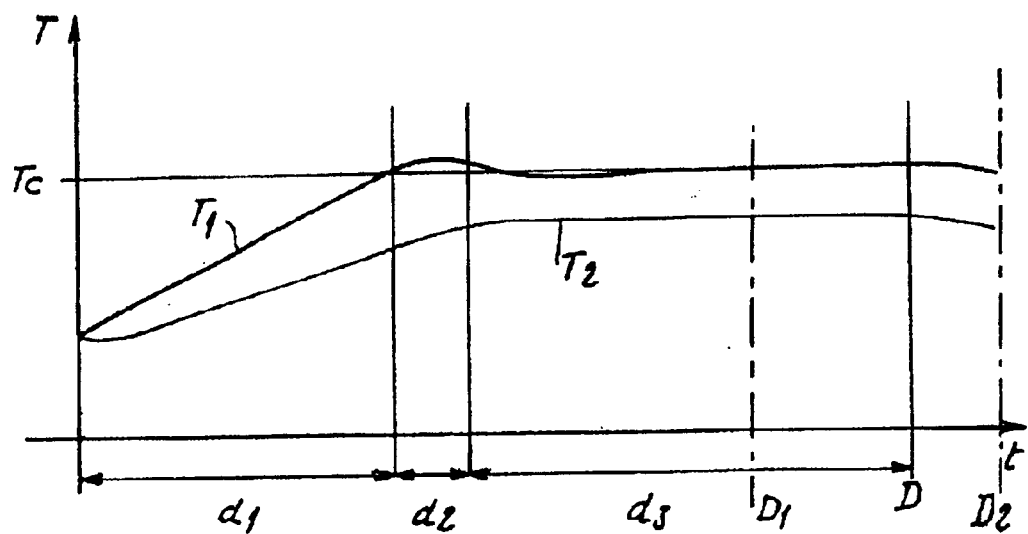
FIG. 5 shows in graph form the variation in the temperatures detected according to the invention, as a function of time, the temperatures T being plotted on the y-axis and the durations or times being plotted on the x-axis.

By means of the two control loops described above, the variation in the temperatures $T_1$ and $T_2$, namely the working and effective temperatures respectively, is shown in FIG. 5.

After the time $d_1$, the working temperature $T_1$ reaches, or does not reach, the set temperature Tc, while during the additional time $d_2$ the working temperature stabilizes, or does not stabilize, at this value Tc.

From the same starting value, the effective temperature $T_2$ varies below the working temperature, and therefore below the set temperature Tc.

After the time d, which varies according to the treatment conditions in the working region, the operation of the IR source 6 is interrupted. This time varies between a minimum time $d_1$, fixed in order to obtain no tack, and a maximum time $d_2$ in order to obtain a predetermined hardness.

By virtue of the invention, by adjusting the operating time of the IR source 6 on the basis of the temperature conditions actually obtained at the periphery of the illumination beam 9, it is certain that the bonding material M has received all the thermal energy required for its crosslinking, at practically any point in the bonding bead 8, and while complying moreover with a relatively low working temperature $T_1$ given the specific environment in the hollow structure 1.

Furthermore, it is preferred to detect a temperature called the safety temperature $T_3$ in a sensitive region of the hollow structure 1, and to interrupt the operation of the IR source 6 by means of the regulator 41 should the safety temperature $T_3$ exceed a value called the safety value above the set temperature Tc.

For this purpose, another temperature sensor identical to that shown and described with reference to FIG. 4 is used, this being placed in the aforementioned sensitive region and connected to the regulator 41.

What is claimed is:

1. Sealing method, used inside a hollow structure defining a confined volume or cavity, taking place by joining together at least two structural parts, which belong to the hollow structure and between them define a line portion leaking to the outside of the said hollow structure, with a bonding material of the adhesive and thermosetting mastic type, the said method comprising the following steps:

(a) a moveable IR source of infrared radiation, in a wavelength spectrum of between 2 and 10 μm with an emission surface suitable for irradiating the leak line portion, is used;

(b) said bonding material, chosen according to its thermosetting characteristics, namely thermosetting time in relation to respectively different thermosetting temperatures, is used in order to obtain, after thermosetting, a predetermined hardness and/or the absence of tack;

(c) the said structural parts are connected with a bead of the bonding material along the leak line portion;

(d) the IR source is placed inside the hollow structure in a position to illuminate the bead of bonding material;

(e) the IR radiation is emitted in the illumination position of the said IR source; and (f) a working temperature ($T_1$) at the said bead, whose bonding material thermally cures, and the power emitted by the IR source is regulated according to the working temperature ($T_1$) and a set temperature (Tc), characterized in that, on the one hand, the working temperature ($T_1$) approximately at a centre of an IR illumination beam of the IR radiation is detected (according to f) and, on the other hand, an effective temperature ($T_2$) in a control region away from the centre of the said illumination beam and at the said bead is detected in order to control an emission time (D) of the IR radiation as a function of the effective temperature ($T_2$) detected, in relation to the thermosetting characteristics of the bonding material (M).

2. Method according to claim 1, characterized in that, for the same set temperature (Tc), the emission time (D) of the IR radiation is increased when the effective temperature ($T_2$) decreases, in relation to the thermosetting characteristics of the bonding material.

3. Method according to claim 1, characterized in that a safety temperature ($T_3$) is detected in a sensitive region of the hollow structure, and the operation of the IR source is interrupted should the safety temperature exceed a safety value above the set temperature Tc.

* * * * *